(12) United States Patent
Ho

(10) Patent No.: US 7,442,440 B2
(45) Date of Patent: Oct. 28, 2008

(54) PAINT COMPOSITION AND COATING STRUCTURE

(75) Inventor: Chi-Chuang Ho, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 195 days.

(21) Appl. No.: 11/414,248

(22) Filed: Apr. 27, 2006

(65) Prior Publication Data

US 2007/0060695 A1    Mar. 15, 2007

(30) Foreign Application Priority Data

Sep. 9, 2005    (CN) .................... 2005 1 0037213

(51) Int. Cl.
 *B32B 5/16*    (2006.01)
 *B32B 9/04*    (2006.01)
(52) U.S. Cl. .................. 428/411.1; 428/323; 428/331
(58) Field of Classification Search .................. None
See application file for complete search history.

(56) References Cited

U.S. PATENT DOCUMENTS 4,312,795 A    1/1982    Taguchi et al.

*Primary Examiner*—Sheeba Ahmed
(74) *Attorney, Agent, or Firm*—Andrew C. Cheng

(57) ABSTRACT

The present invention provides a paint composition including a primer and a finish paint. The primer includes a resin matrix, and a hydroxylated carbon nano-material admixed into the resin matrix. The hydroxylated carbon nano-material has a relatively high proportion of hydroxyl groups. The finish paint includes colloidal silica having a relatively high proportion of hydroxyl groups. The hydroxyl groups of the colloidal silica are capable of a dehydration reaction with the hydroxyl groups of the carbon nano-material at an interface between the primer and the finish paint. The present invention also relates to a coating structure including a priming coating and finish coating, and to a method for coating a substrate using the paint composition. The coating structure using the paint composition has good transparency and high mechanical strength.

6 Claims, 1 Drawing Sheet

PAINT COMPOSITION AND COATING STRUCTURE

BACKGROUND

1. Technical Field

The present invention generally relates to a paint composition and a related coating structure. The present invention also relates to a coating method for using the paint composition.

2. Description of Related Art

Paint is widely used for vehicle, furniture and electrical appliances. It is thus necessary for paint to be hard and smooth with good transparency whilst also having attractive color and appearance.

Conventionally, paint is composed of a resin matrix and an amount of pigment particles blended therein. The pigment particles are commonly an inorganic substance such as carbon black. Carbon black is a powdered form of elemental carbon manufactured by the vapour-phase pyrolysis of hydrocarbon mixtures, such as heavy petroleum distillates and residual oils, coal-tar products, natural gas and acetylene. Carbon black is characterized by the size distribution of the primary particles, the degree of their aggregation and agglomeration and the various chemicals adsorbed onto the surfaces. The color of carbon black is black because carbon black absorbs all incident visible light as well as UV light. The particle size of carbon black using in paint is commonly of a size in the micron range. A percentage of carbon black particles to the resin matrix by weight is generally in the approximate range from 5 percent to 6 percent.

However, the physical and chemical properties of inorganic pigment particles such as carbon black are quite different from that of the resin matrix, therefore, dissolution and dispersion of carbon black particles in the resin matrix is unsatisfactory. Thus, a surface having the paint composition coated thereon may be rough, and unsatisfactory in appearance. In addition, because the carbon black particles are simply mixed with the resin matrix without undergoing any reaction, physical force therebetween is very weak. Carbon black particles are often eroded out of the surface of product, thus creating cavities, which affect the mechanical properties and appearance of the coating.

What is needed, therefore, is a paint composition and a related coating structure with good smoothness, good transparency and high binding force.

What is also needed, therefore, is a coating method using the paint composition.

SUMMARY

One preferred embodiment of the present invention provides a paint composition including a primer and a finish paint The primer includes a resin matrix, and a hydroxylated carbon nano-material admixed into the resin matrix. The hydroxylated carbon nano-material has a relatively high proportion of hydroxyl groups. The finish paint includes colloidal silica having a relatively high proportion of bydroxyl groups. The hydroxyl groups of the colloidal silica are capable of a dehydration reaction with the hydroxyl groups of the hydroxylated carbon nano-material at an interface between the primer and the finish paint.

Another preferred embodiment of the present invention provides a coating structure including a primer coating and a finish coating. The primer coating includes a resin matrix, and a hydroxylated carbon nano-material admixed into the resin matrix. The finish coating is formed on the primer coating, and includes colloidal silica. The colloidal silica present at an interface between the primer coating and the finish coating is linked to the hydroxylated carbon nano-material at the interface by means of a dehydration reaction between the hydroxylated carbon nano-material and the colloidal silica.

A method for coating a substrate in accordance with the preferred embodiment of the invention includes steps of: applying a primer on the substrate, which includes a resin matrix and a hydroxylated carbon nano-material admixed into the resin matrix, the hydroxylated carbon nano-material having a relatively high proportion of hydroxyl groups; applying a finish paint on the primer, which includes colloidal silica having a relatively high proportion of hydroxyl groups; and conducting a dehydration reaction between the hydroxylated carbon nano-material in the primer and the colloidal silica in the finish paint at an interface between the primer and the finish paint such that the primer and the finish paint are linked to each other at the interface therebetween.

BRIEF DESCRIPTION OF THE DRAWINGS

Many aspects of the present invention can be better understood with reference to the following drawings. The components in the drawings are not necessarily drawn to scale, the emphasis instead being placed upon clearly illustrating the principles of the present invention. Moreover, in the drawings, like reference numerals designate corresponding parts its throughout the several views.

DETAILED DESCRIPTION OF PREFERRED EMBODIMENTS

Figure 1A:
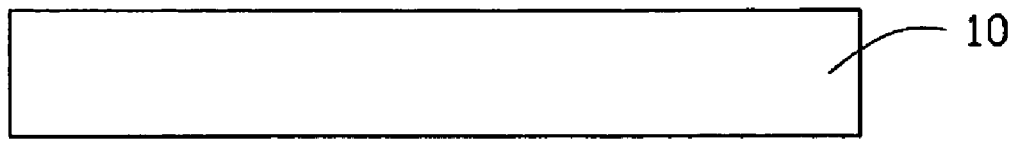
FIG. 1A is a schematic view of a substrate on which a paint composition according to a preferred embodiment of the present invention is to be applied thereon.

Embodiments of the present invention will now be described in detail below and with reference to the drawings.

The first embodiment provides a paint composition, which includes a primer and a finish paint.

The primer includes a resin matrix, and a hydroxylated carbon nano-material admixed into the resin matrix.

The resin matrix, which is commonly a main component of paint, can be epoxy resin matrix, acrylic resin matrix and amino resin matrix, and so on.

The hydroxylated carbon nano-material is a carbon nano-material composite with a lot of hydroxyl groups. Exterior carbon atoms of the carbon nano-material undergo a hydroxylation reaction thereby obtaining the hydroxylated carbon nano-material. The hydroxylated carbon nano-material can be linked with the colloidal silica by dehydration during heating.

The hydroxylated carbon nano-material can be selected from a group consisting of carbon nanotubes, carbon nanospheres, and carbon nanofibers and any combination thereof.

In the present paint composition, a percentage of the hydroxylated carbon nano-material in the resin matrix by weight is in a range from 5 percent to 6 percent.

The finish paint includes colloidal silica. Colloidal silica has promising properties of high specific surface area and strong absorbability, and can form transparent thin film. Colloidal silica, also known as a ludox or silica sol, has a formula of $mSiO_2 \cdot nH_2O_2$. Colloidal silica is a colloidal solution with a faint opaque blue color. Generally, the colloidal silica can be prepared by dispersing discrete spheres of silica in an alkaline medium. During the dispersing process, the alkaline medium reacts with the silica thereby bonding hydroxyl groups with negative charges with the silica particles. The silica particles can be stably, uniformly dispersed due to the repulsion between the negative charges. The hydroxyl groups of colloidal silica are provided for undergoing a dehydration reaction with the hydroxyl groups of the hydroxylated carbon nano-material at an interface between the primer and the finish paint. The structural formula of the colloidal silica is:

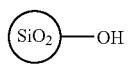

In the preferred embodiment, the paint composition can form a coating structure. The coating structure includes a primer coating and a finish coating.

The primer coating includes a resin matrix, and a hydroxylated carbon nano-material admixed into the resin matrix. A percentage of the hydroxylated carbon nano-material in the resin matrix by weight is in a range from 5 percent to 6 percent. The hydroxylated carbon nano-material is a carbon nano-material composite with a lot of hydroxyl groups. The hydroxylated carbon nano-material is selected from the group consisting of carbon nanotubes, carbon nanospheres, and carbon nanofibers and any combination thereof.

The finish coating is formed on the primer coating. Because the colloidal silica has lots of hydroxyl groups, which makes the colloidal silica link to the hydroxylated carbon nano-material at an interface between the primer coating and the finish coating by means of a dehydration reaction. The dehydration reaction occurs between hydroxyl groups of the hydroxylated carbon nano-material and the colloidal silica.

Figure 1B:
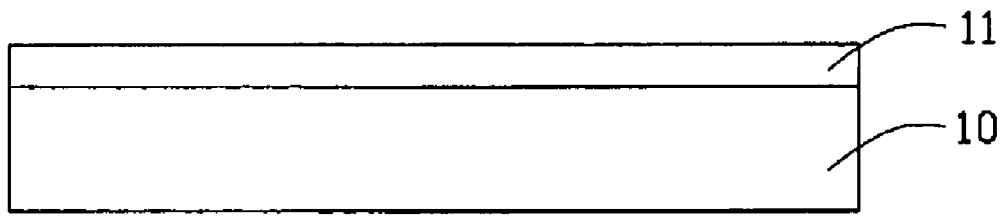
FIG. 1B is similar to FIG. 1A, but showing a primer coating of the paint composition coated on the substrate of FIG. 1A.
Figure 1C:
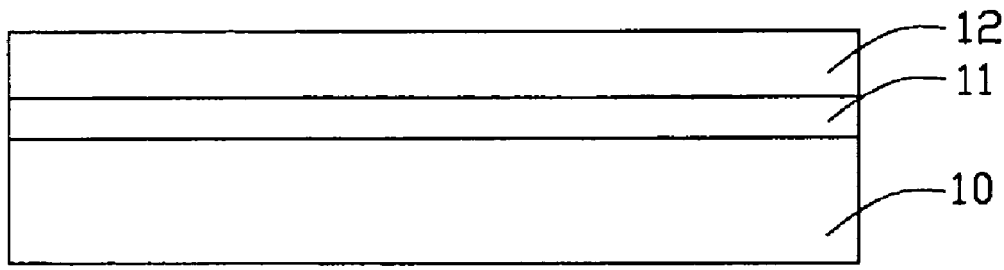
FIG. 1C is similar to FIG. 1B, but showing a finish coating of the paint composition coated on the primer coating of FIG. 1B.

Referring to FIGS. 1A to 1C, a method for coating a substrate using the paint composition includes the steps of:

step 1: applying a primer on a substrate, which includes a resin matrix and a hydroxylated carbon nano-material admixed into the resin matrix, the hydroxylated carbon nano-material including a relatively high proportion of hydroxyl groups;

step 2: applying a finish paint on the primer, which includes colloidal silica having a relatively high proportion of hydroxyl groups; and step 3: conducting a dehydration reaction between the hydroxylated carbon nano-material in the primer and the colloidal silica in the finish paint at an interface between the primer and the finish paint such that the primer and the finish paint are linked to each other at the interface therebetween.

The following aspect of the embodiment describes the method for coating a substrate using the paint composition in detail.

In the step 1, referring to FIG. 1A, a substrate 10, such as metallic substrate or plastic substrate, is provided. The metallic substrate includes, for example, magnesium alloy, aluminium alloy and steel. The plastic substrate includes, for example, acrylonitrile butadiene styrene (ABS), polycarbonate, methacrylic resins and polyurethane polymers.

Firstly, the hydroxylated carbon nano-material is admixed into the resin matrix, thereby forming the primer including the hydroxylated carbon nano-material. The hydroxylated carbon nano-material has a relatively high proportion of hydroxyl groups. A percentage of the hydroxylated carbon nano-material in the resin matrix by weight is in a range from 5 percent to 6 percent.

Secondly, according to the preferred embodiment, referring to FIG. 1B, the application of a primer on the substrate 10 can be performed by means of spin coating.

The process of spin coating commonly includes two steps. At first, the primer containing the hydroxylated carbon nano-material is deposited on or near a center of the substrate 10. The amount of the primer paint deposited depends on the viscosity of the fluid and the size of the substrate 10 to be applied. Then, the substrate 10 is spun at a high speed of about 3000 rpm to thin the primer paint. Centripetal acceleration will cause the primer paint to spread to the edge of the substrate 10 leaving a thin film of the primer paint on the surface. Eventually, a primer coating 11 is formed on the substrate 10.

An alternative process for applying the primer on the substrate 10 can be uniform coating, pre-coating, or chemical vapor deposition(CVD).

In step 2, referring to FIG.1C, the finish paint containing colloidal silica can be applied on the primer by means of spray coating, such as plasma spray coating, flame spray coating, thermal spray coating. The finish paint is sprayed onto the primer coating 11 coated on the substrate 10 using a spray gun thereby forming the uniform finish coating 12.

An alternative process for applying the finish paint on the primer can be vapor deposition.

In step 3, after finishing application of both the primer and the finish paint on the substrate 10, the substrate is heated. The excess solvent on the substrate 10 is eliminated by heating the substrate to a temperature in an approximate range from 60 degrees celsius to 80 Celsius. Simultaneously, a dehydration reaction will occur between the hydroxylated carbon nano-material in the primer and the colloidal silica in the finish paint at an interface between the primer and the finish paint. The primer and the finish paint are linked to each other at the interface by dehydration of hydroxyl groups of the hydroxylated carbon nano-material in the primer and hydroxyl groups of the colloidal silica in the finish paint. During the process, the moisture produced also can be evaporated together with the excess solvent by heating. As a result, a coating structure including the primer coating 11 and the finish coating 12 is formed on the substrate 10. The primer coating 11 and the finish coating 12 are linked to each other at the interface therebetween.

The dehydration reaction process can be easily understood from the following reaction equation. The carbon nano-material is represented by NCM. Carbon atoms on the surface of the carbon nano-material undergo a hydyoxylation thereby obtaining the hydroxylated carbon nano-material. Therefore, the hydroxylated carbon nano-material includes a relatively high proportion of hydroxyl groups on the surface thereof. When the substrate is heated, the dehydration reaction occurs. In result, the hydroxylated carbon nano-material is linked to the colloidal silica by dehydration.

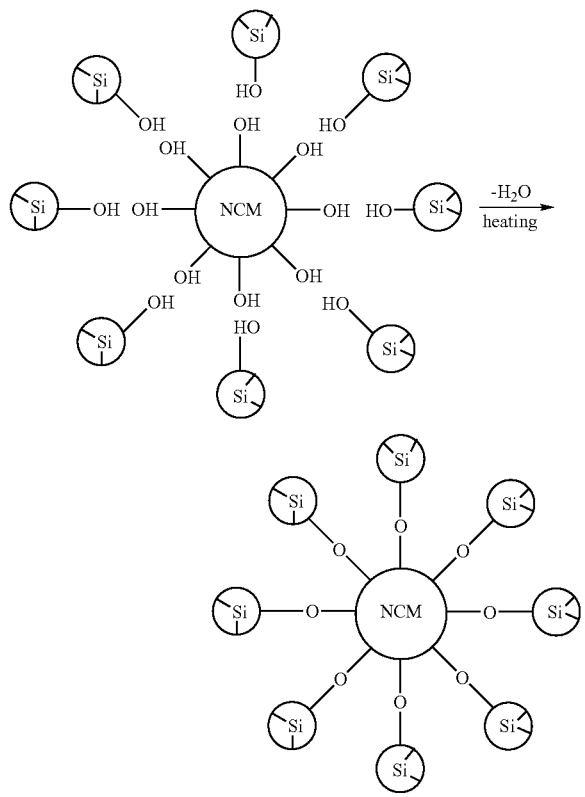

In the preferred embodiment, the temperature for the dehydration reaction is preferably about 60 degrees celsius.

While certain embodiments of the present invention have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

I claim:

1. A paint composition comprising:
   a primer comprised of a resin matrix, and a hydroxylated carbon nano-material admixed into the resin matrix, the hydroxylated carbon nano-material having a plurality of hydroxyl groups; and
   a finish paint comprised of colloidal silica having a plurality of hydroxyl groups, the hydroxyl groups being capable of a dehydration reaction with the hydroxyl groups of the hydroxylated carbon nano-material at an interface between the primer and the finish paint.

2. The paint composition as claimed in claim 1, wherein a percentage of the hydroxylated carbon nano-material in the resin matrix by weight is in a range from 5 percent to 6 percent.

3. The paint composition as claimed in claim 1, wherein the hydroxylated carbon nano-material is selected from a group consisting of carbon nanotubes, carbon nanospheres, carbon nanofibers and any combination thereof.

4. A coating structure comprising:
   a primer coating comprised of a resin matrix, and a hydroxylated carbon nano-material admixed into the resin matrix; and
   a finish coating formed on the primer coating, the finish coating comprised of colloidal silica, the colloidal silica present at an interface between the primer coating and the finish coating being linked to the hydroxylated carbon nano-material at the interface by means of a dehydration reaction between the hydroxylated carbon nano-material and the colloidal silica.

5. The coating structure as claimed in claim 4, wherein a percentage of the hydroxylated carbon nano-material in the resin matrix by weight is in a range from 5 percent to 6 percent.

6. The coating structure as claimed in claim 4, wherein the hydroxylated carbon nano-material is selected from a group consisting of carbon nanotubes, carbon nanospheres, carbon nanofibers and any combination thereof.

* * * * *